(12) United States Patent
Asai et al.

(10) Patent No.: US 9,372,087 B2
(45) Date of Patent: Jun. 21, 2016

(54) METHOD OF PROVIDING DESTINATION INFORMATION, DESTINATION-INFORMATION PROVIDING APPARATUS AND STORAGE MEDIUM

(71) Applicant: FUJITSU LIMITED, Kawasaki-shi, Kanagawa (JP)

(72) Inventors: Tatsuya Asai, Kawasaki (JP); Hiroaki Morikawa, Kawasaki (JP); Junichi Shigezumi, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/456,188

(22) Filed: Aug. 11, 2014

(65) Prior Publication Data
US 2015/0088410 A1 Mar. 26, 2015

(30) Foreign Application Priority Data
Sep. 20, 2013 (JP) ................................. 2013-196179

(51) Int. Cl.
*G01C 21/34* (2006.01)
*G01C 21/20* (2006.01)

(52) U.S. Cl.
CPC ...................... *G01C 21/20* (2013.01)

(58) Field of Classification Search
CPC ...... H04W 64/00; H04W 88/02; G01C 21/34; G01C 21/3679; G08G 1/0969; G08G 1/144
USPC ................. 701/25, 408, 420, 533; 455/456.1, 455/456.3, 11.1; 340/539.13
See application file for complete search history.

(56) References Cited

U.S. PATENT DOCUMENTS

| 8,073,615 B2 * | 12/2011 | Kudoh | ............... G01C 21/3617 701/426 |
| 8,538,686 B2 * | 9/2013 | Gruen | ................ G01C 21/3617 190/102 |

(Continued)

FOREIGN PATENT DOCUMENTS

| JP | 2010-211679 | 9/2010 |
| JP | 2011-034402 | 2/2011 |
| JP | 2012-008659 | 1/2012 |

OTHER PUBLICATIONS

Monreale et al., "WhereNext: a Location Predictor on Trajectory Pattern Mining", Pro KDD '09, pp. 637-645 (2009).

*Primary Examiner* — Dalena Tran
(74) *Attorney, Agent, or Firm* — Staas & Halsey LLP

(57) ABSTRACT

A method of providing destination information includes storing route information in which location information identifying locations, coordinate points information, and information of locations adjacent to the locations are associated with each other; storing probability information in which current locations, destinations, and probabilities of moving from the current locations to the corresponding destinations are associated with each other; receiving information indicating a current position of a terminal apparatus; determining a current location corresponding to the current position; determining one or more first destination candidates based on the probability information; determining one or more second destination candidates among the one or more first destination candidates, when a next destination is not uniquely identifiable; determining a nearby location indicating a location adjacent to each second destination candidate and the current location; and determining the next destination among the one or more second destination candidates, by assuming the nearby location as the current location.

13 Claims, 20 Drawing Sheets

| PROBABILITY TABLE | | |
|---|---|---|
| CURRENT LOCATION | DESTINATION | PROBABILITY |
| A | X | 80% |
| A | Y | 20% |

(56) References Cited

U.S. PATENT DOCUMENTS

| | | | | |
|---|---|---|---|---|
| 8,700,067 B2* | 4/2014 | Shirakawa | ............. | G06Q 10/10 455/414.1 |
| 8,938,358 B1* | 1/2015 | Shynar | ............... | G01C 21/3617 701/533 |
| 2004/0128066 A1* | 7/2004 | Kudo | ................. | G01C 21/3617 701/468 |
| 2011/0029465 A1 | 2/2011 | Ito et al. | | |
| 2011/0313957 A1 | 12/2011 | Ide et al. | | |
| 2013/0345961 A1* | 12/2013 | Leader | ................... | G01C 21/20 701/410 |

* cited by examiner

FIG. 5

| ROUTE GRAPH DATABASE | | |
|---|---|---|
| LOCATION | LOCATION INFORMATION | ADJACENT LOCATION(S) |
| A | 35.452653, 139.604389 | B, X, Y |
| B | 35.454948, 139.631429 | A, X, Y |
| X | 35.465592, 139.620660 | A, B, P, Q |
| Y | 35.439786, 139.622732 | A, B, R, S |
| P | 35.476590, 139.604524 | X |
| Q | 35.477951, 139.620660 | X |
| R | 35.433926, 139.600929 | Y |
| S | 35.431299, 139.633350 | Y |
| ... | ... | ... |

FIG. 6

| PROBABILITY TABLE | | |
|---|---|---|
| CURRENT LOCATION | DESTINATION | PROBABILITY |
| A | X | 80% |
| A | Y | 20% |
| B | X | 50% |
| B | Y | 50% |
| ... | ... | ... |

FIG. 7

| FREQUENCIES FOR MOVEMENT ROUTES |||
|---|---|---|
| CURRENT LOCATION | DESTINATION | FREQUENCY |
| A | X | 40 |
| A | Y | 10 |
| B | X | 10 |
| B | Y | 10 |
| P | X | 30 |
| Q | Y | 20 |
| R | X | 40 |
| S | Y | 40 |
| ... | ... | ... |

FIG. 8

| PROBABILITY TABLE | | | |
|---|---|---|---|
| LOCATION IMMEDIATELY PRECEDING CURRENT LOCATION | CURRENT LOCATION | DESTINATION | PROBABILITY |
| A | B | X | 50% |
| A | B | Y | 50% |
| B | A | X | 80% |
| B | A | Y | 20% |
| ... | ... | ... | ... |

FIG. 9

| FREQUENCIES FOR MOVEMENT ROUTES | | | |
|---|---|---|---|
| LOCATION IMMEDIATELY PRECEDING CURRENT LOCATION | CURRENT LOCATION | DESTINATION | FREQUENCY |
| A | B | X | 10 |
| A | B | Y | 10 |
| B | A | X | 20 |
| B | A | Y | 5 |
| ... | ... | ... | ... |

FIG. 12

| PROBABILITY TABLE | | |
|---|---|---|
| CURRENT LOCATION | DESTINATION | PROBABILITY |
| A | X | 80% |
| A | Y | 20% |

FIG. 15

```
DESTINATION CANDIDATES
      X : 80%
      Y : 20%

THEREFORE, YOUR NEXT DESTINATION IS X
```

FIG. 20

| TRANSPORTATION NETWORK DATABASE | | |
|---|---|---|
| LOCATION | NEAREST RAILROAD LINE | NEAREST ARTERIAL ROAD |
| A | LINE c | NATIONAL ROAD 1 |
| B | LINE a , LINE b | NATIONAL ROAD 16 NATIONAL ROAD 133 |
| C | LINE a , LINE b | NATIONAL ROAD 16 |
| X | LINE a , LINE b ,LINE c | NATIONAL ROAD 1 NATIONAL ROAD 15 |
| Y | - | NATIONAL ROAD 100 |
| P | - | NATIONAL ROAD 1 |
| Q | LINE c | NATIONAL ROAD 1 NATIONAL ROAD 15 |
| R | - | - |
| S | - | - |
| ... | ... | ... |

METHOD OF PROVIDING DESTINATION INFORMATION, DESTINATION-INFORMATION PROVIDING APPARATUS AND STORAGE MEDIUM

CROSS-REFERENCE TO RELATED APPLICATION

This application is based upon and claims the benefit of priority of the prior Japanese Patent Application No. 2013-196179 filed on Sep. 20, 2013, the entire contents of which are incorporated herein by reference.

FIELD

The embodiment discussed herein is related to a method of providing destination information, a destination-information providing apparatus, and a storage medium.

BACKGROUND

Terminal apparatuses typified by mobile phones, smartphones, and so on are generally equipped with location-determining functions, such as those of global positioning systems (GPSs). Thus, the user of each terminal apparatus can determine its current location. Also, by transmitting information about the current location to a server through a network, the user can receive various types of service information corresponding to the location. For example, in recent years, service providers have been offering travel guide services that deliver information about sightseeing spots in the vicinity of the current positions of users (for example, travelers) of terminal apparatuses, based on location information of the users. Related art is disclosed in, for example, Japanese Laid-open Patent Publication No. 2011-34402, Japanese Laid-open Patent Publication No. 2012-8659, Japanese Laid-open Patent Publication No. 2010-211679, and A. Monreale et al., "WhereNext: a Location Predictor on Trajectory Pattern Mining" Proc. KDD '09, pp. 637-645 (2009).

SUMMARY

According to an aspect of the invention, a method of providing destination information executed by a processor included in a destination-information providing apparatus, the method includes storing route information in which location information identifying locations, coordinate points information of the locations, and information of locations adjacent to the locations are associated with each other; storing probability information in which current locations, destinations, and probabilities of moving from the current locations to the corresponding destinations are associated with each other; receiving information indicating a current location of a terminal apparatus; determining, from among the locations, a current location corresponding to the current location based on the route information; determining one or more first destination candidates, each of the one or more first destination candidates being a candidate of a next destination for the current location, based on the probability information; determining one or more second destination candidates among the one or more first destination candidates based on the probability information, when the next destination is not uniquely identifiable from among the one or more first destination candidates; determining a nearby location indicating a location adjacent to each of the one or more second destination candidates and the current location, based on the route information; and determining the next destination among the one or more second destination candidates, by assuming the nearby location as the current location of the terminal apparatus and based on the probability information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a route-graph database depicting the data structure of the route graph illustrated in FIG. 4;

FIG. 6 illustrates an example of a probability table;

FIG. 7 illustrates an example of information of frequencies for respective past traveler movement routes;

FIG. 8 illustrates an example of the probability table;

FIG. 9 illustrates a modification of the information of the frequencies for the respective past traveler movement routes;

FIG. 12 illustrates an example of a result obtained by sorting, in descending order of probability, the primary destination candidates when the current location is A;

FIG. 15 illustrates an example of information about a destination to be recommended, the information being output to a user;

FIG. 20 is a table illustrating an example of a transportation network database.

DESCRIPTION OF EMBODIMENT

An embodiment of the present disclosure will be described below in detail with reference to FIGS. 1 to 20.

Figure 1:
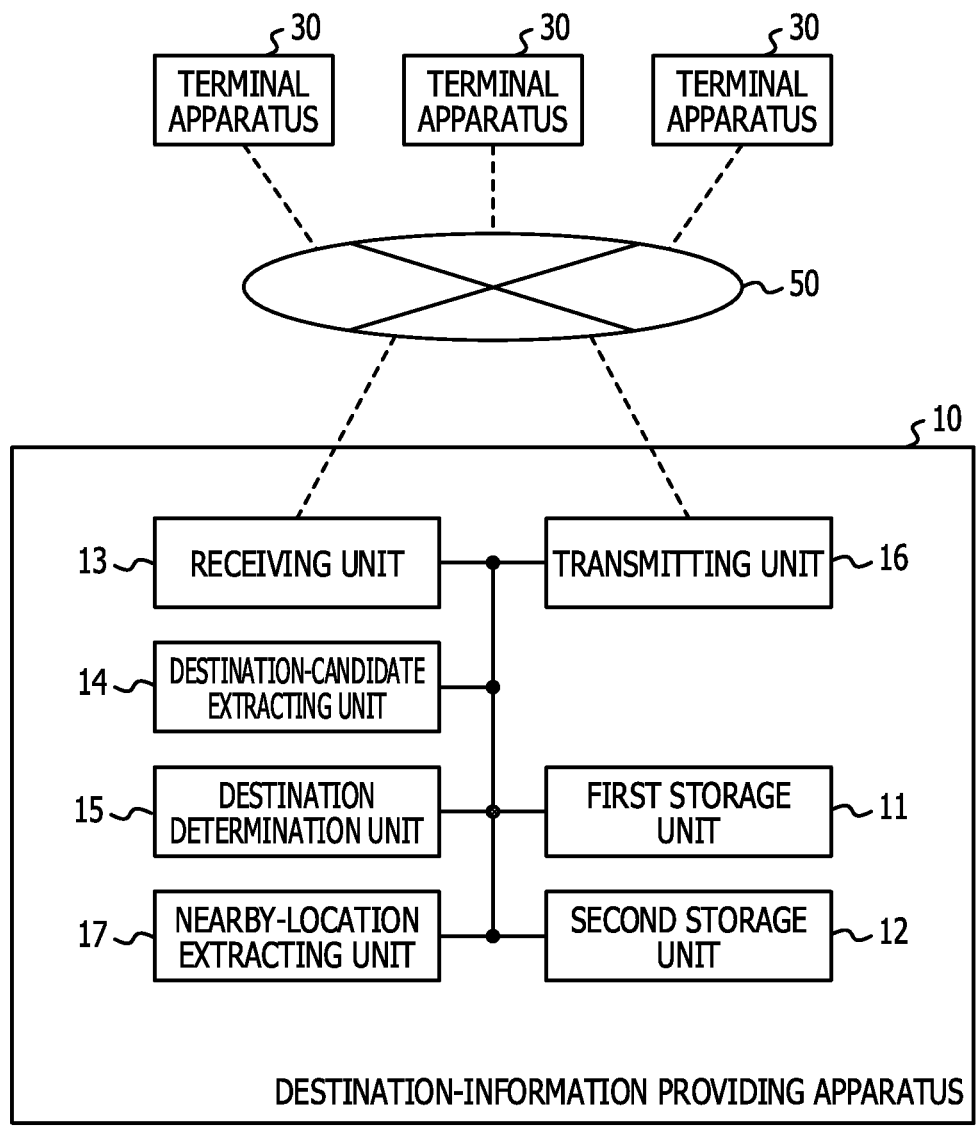
FIG. 1 is a diagram illustrating an example of the configuration of a destination-information providing system.

FIG. 1 is a diagram illustrating an example of a destination-information providing system. As illustrated in FIG. 1, the destination-information providing system includes a destination-information providing apparatus 10 and terminal apparatuses 30. The destination-information providing apparatus 10 and the terminal apparatuses 30 are connected to each other through a network 50 so as to allow mutual communications.

The destination-information providing apparatus 10 is an apparatus that receives, from each terminal apparatus 30, a recommendation request for recommending candidates of a next destination and provides a user who possesses the terminal apparatus 30 with information about a destination. The destination-information providing apparatus 10 is implemented by, for example, a server or a personal computer (PC). A method for processing executed by the destination-information providing apparatus 10 is described later.

Each terminal apparatus 30 is a terminal in the possession of a user of a destination-information providing service. The terminal apparatus 30 is, for example, a smartphone, a mobile phone, a notebook personal computer (PC), or a tablet terminal. The terminal apparatus 30 has a location-determining function. The location-determining function is, for example, a GPS. In addition to GPS, the terminal apparatus 30 may have a function for determining location information by utilizing location information of a base station used for phone calls or communications via mobile phones or a function for determining location information by utilizing Wi-Fi radio waves.

Next, a description will be given of the hardware configuration of the destination-information providing apparatus 10.

Figure 2:
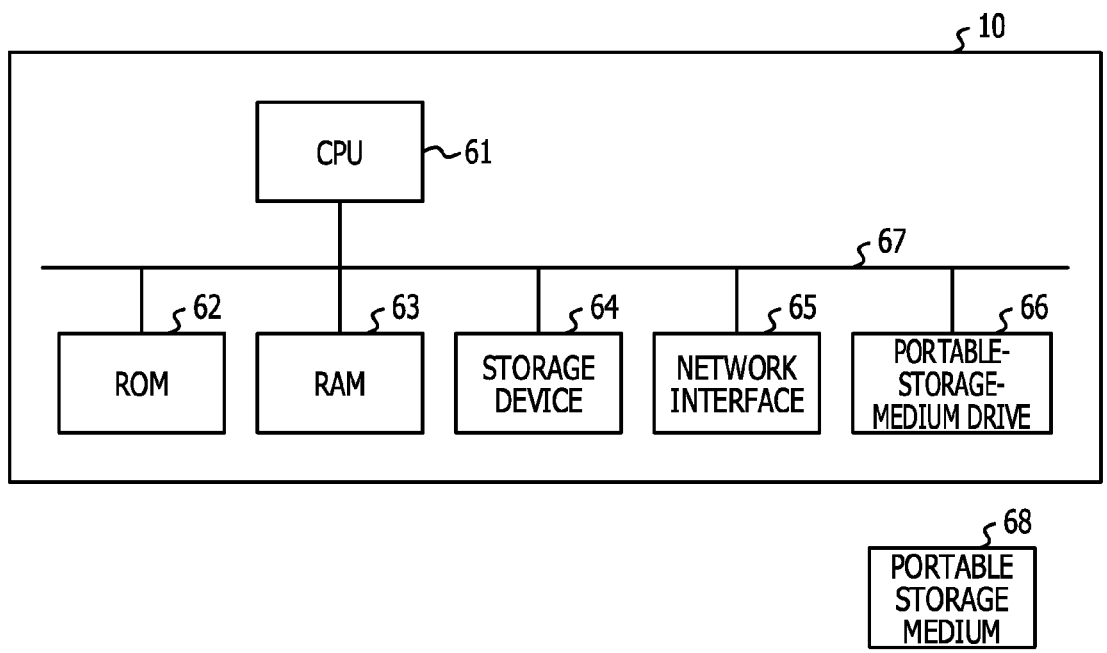
FIG. 2 is a diagram illustrating an example of the hardware configuration of a destination-information providing apparatus.

FIG. 2 is a diagram illustrating an example of the hardware configuration of the destination-information providing apparatus 10. As illustrated in FIG. 2, the destination-information providing apparatus 10 includes a central processing unit (CPU) 61, a read-only memory (ROM) 62, a random access memory (RAM) 63, a storage device 64, a network interface 65, and a portable-storage-medium drive 66.

The elements included in the destination-information providing apparatus 10 are connected to a bus 67. The storage device 64 is, for example, a hard disk drive (HDD). A processor, such as the CPU 61, in the destination-information providing apparatus 10 executes programs (including a destination-information providing program for determining a destination to be recommended) stored in the ROM 62 or the storage device 64 or programs (including the destination-information providing program) read from a portable storage medium 68 by the portable-storage-medium drive 66, to thereby realize functions of the destination-information providing apparatus 10. The network interface 65 is, for example, a network interface card (NIC).

Functions of the elements included in the destination-information providing apparatus 10 will be described next while referring back to FIG. 1.

As illustrated in FIG. 1, the destination-information providing apparatus 10 includes a first storage unit 11, a second storage unit 12, a receiving unit 13, a destination-candidate extracting unit 14, a destination determination unit 15, a transmitting unit 16, and a nearby-location extracting unit 17.

The first storage unit 11 corresponds to, for example, the ROM 62, the storage device 64, the portable-storage-medium drive 66, or the portable storage medium 68 illustrated in FIG. 2. The first storage unit 11 may store the destination-information providing program.

The second storage unit 12 corresponds to, for example, the ROM 62, the RAM 63, the storage device 64, the portable-storage-medium drive 66, or the portable storage medium 68 illustrated in FIG. 2. The second storage unit 12 is used as a database for storing a probability table and a route graph used for processing performed in the destination-information providing apparatus 10. The probability table has information in which current locations, destinations, and probabilities with which travelers who are present at the current locations move to the corresponding destinations are associated with each other. The route graph is route information including multiple locations, the presence/absence of routes that connect the locations, and coordinate points information of the locations. Details of the probability table and the route graph are described later.

The receiving unit 13 receives a recommendation request for recommending candidates of a next destination based on the current position of terminal apparatus 30 and information about the position of the terminal apparatus 30 in the possession of the user. The receiving unit 13 is connected with the terminal apparatuses 30 so as to allow mutual communications. The receiving unit 13 is realized by, for example, the network interface 65 illustrated in FIG. 2. Information about the current position is hereinafter referred to as "current position information".

Based on the current position information received from the terminal apparatus 30, the destination-candidate extracting unit 14 extracts, from the probability table stored in the second storage unit 12, destination candidates, which are candidates of the destinations of the travelers, and information of probabilities with which the travelers moves from the current locations to the corresponding destination candidates.

Based on the destination candidates and the probability information extracted by the destination-candidate extracting unit 14, the destination determination unit 15 determines a destination to be recommended among the destination candidates.

The transmitting unit 16 transmits, to the terminal apparatus 30, information about the destination to be recommended which was determined by the destination determination unit 15 in the destination-information providing apparatus 10.

The nearby-location extracting unit 17 extracts, on the route graph, a nearby location adjacent to the current location. Details of a method for extracting the nearby location are described later.

The destination-candidate extracting unit 14, the destination determination unit 15, and the nearby-location extracting unit 17 are realized by, for example, a processor, such as the CPU 61 illustrated in FIG. 2 or a micro processing unit (MPU).

Next, a description will be given of a destination-information providing method executed by the destination-information providing apparatus 10.

Figure 3:
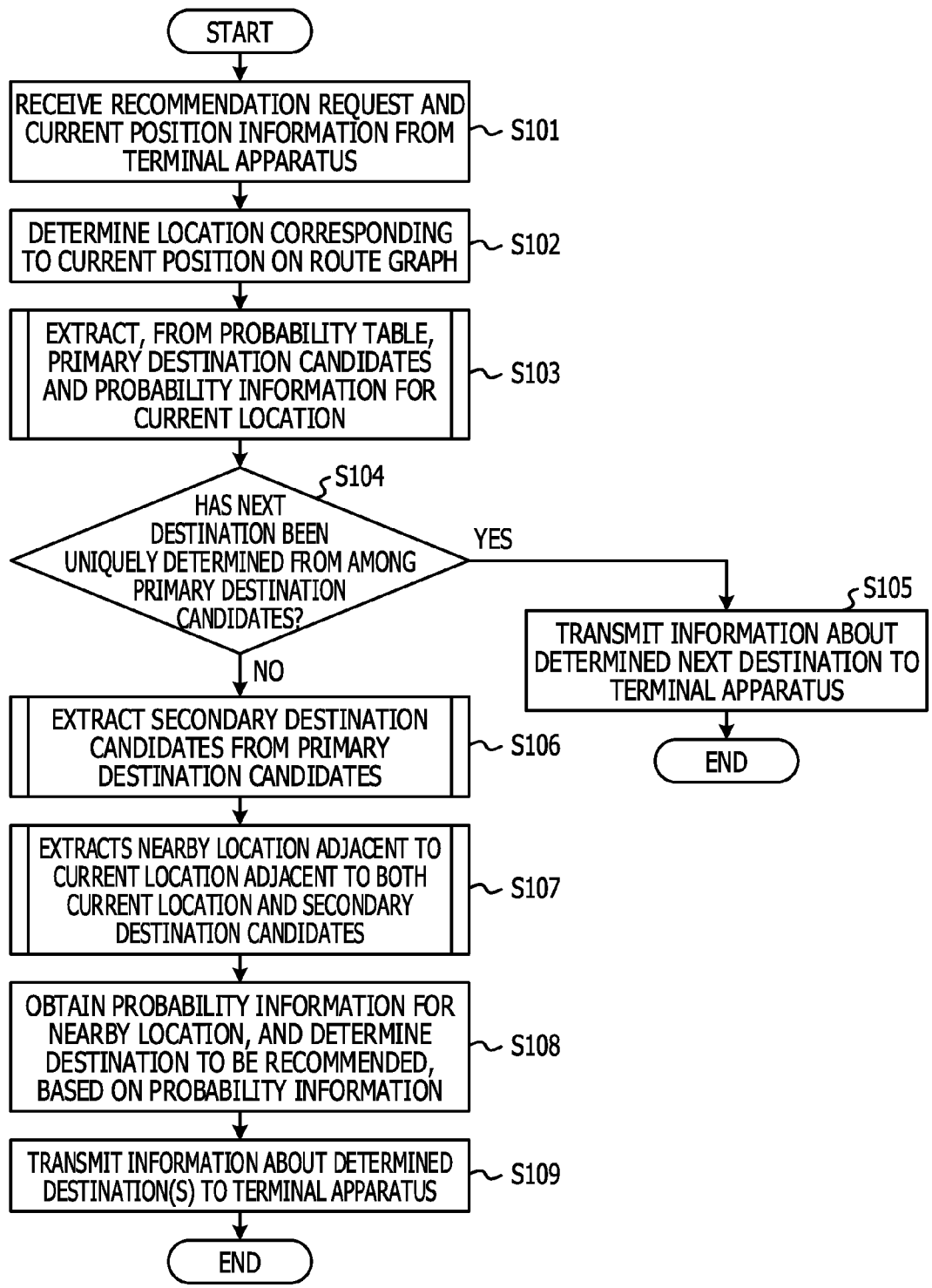
FIG. 3 is a flowchart illustrating an example of a destination-information providing method executed by the destination-information providing apparatus.

FIG. 3 is a flowchart illustrating an example of the destination-information providing method executed by the destination-information providing apparatus 10.

First, a user of the destination-information providing service transmits the recommendation request and the current position information to the destination-information providing apparatus 10 by using the terminal apparatus 30 he or she possesses, in order to receive a recommendation for a next destination from the destination-information providing apparatus 10. Subsequently, in S101, the receiving unit 13 in the destination-information providing apparatus 10 receives the recommendation request and the current position information from the terminal apparatus 30. The receiving unit 13 stores the received position location information in the second storage unit 12.

Figure 4:
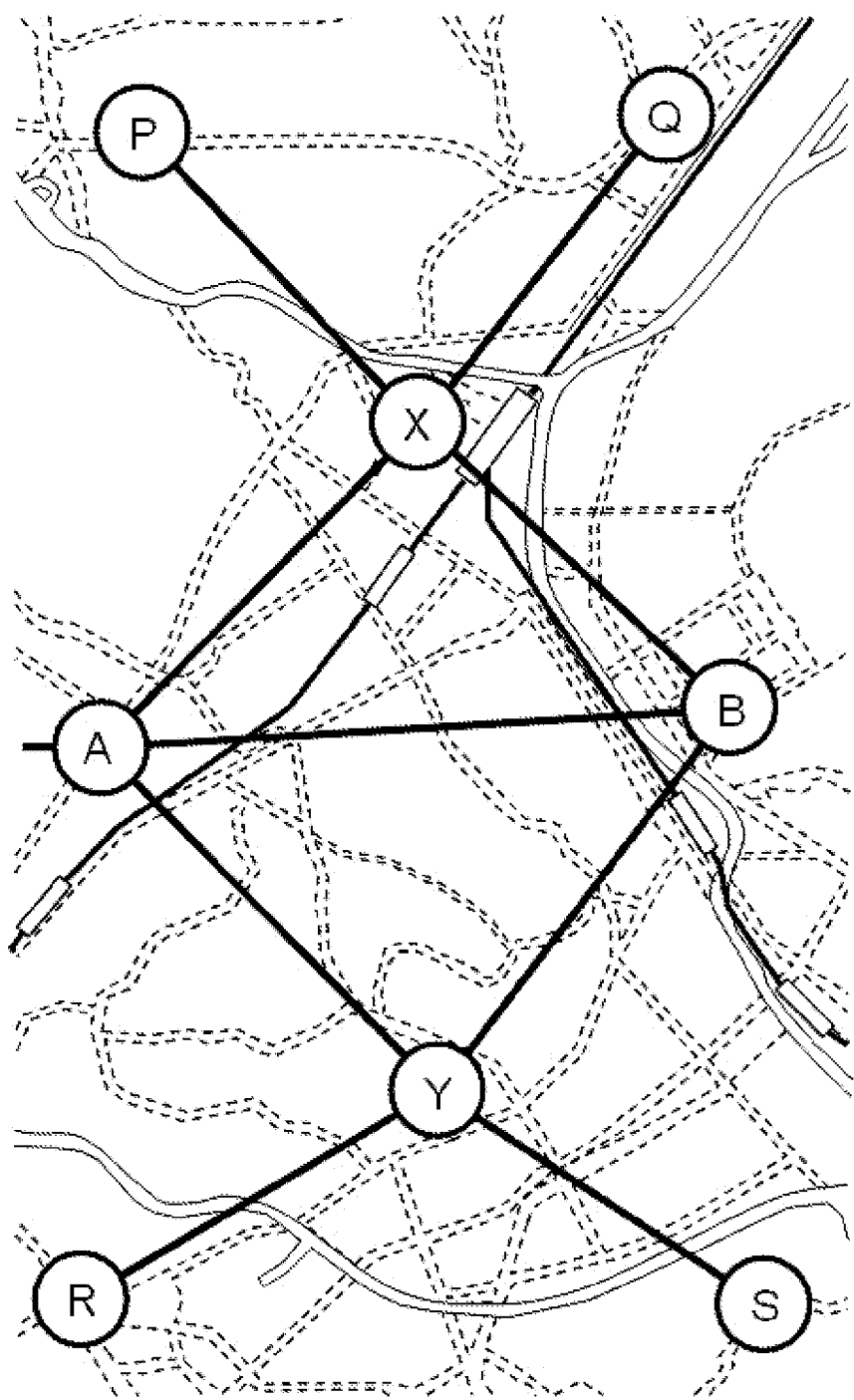
FIG. 4 illustrates an example of a route graph.

FIG. 4 illustrates an example of the route graph. In FIG. 4, for ease of understanding, the route graph is displayed superimposed on a sightseeing map. In the sightseeing map illustrated in FIG. 4, roads denoted by solid lines represent highways. Roads denoted by dotted lines represent general roads. Rectangles represent railroad stations. Solid lines that connect the stations represent railroad lines. In addition, in the route graph illustrated in FIG. 4, A, B, X, Y, P, Q, R, and S indicate locations representing destinations (for example, sightseeing spots). Lines that connect the destinations represent routes.

FIG. 5 illustrates an example of a route-graph database depicting the data structure of the route graph illustrated in FIG. 4. The route-graph database is stored in the second storage unit 12. As illustrated in FIG. 5, the route-graph database is a database in which the location information and information about adjacent locations are associated with each other for each of the locations A, B, X, Y, P, Q, R, and S. In each "location information" field in the route-graph database, latitude and longitude information is stored as information of the coordinate points of the corresponding location. In each "adjacent location" field, information about the location(s) adjacent to the corresponding location on the route graph is stored.

Referring back to FIG. 3, after the process in S101, in S102, the destination-candidate extracting unit 14 determines the location corresponding to the current location on the route graph, based on the received current position information. More specifically, based on the received current position information, the destination-candidate extracting unit 14 allocates, as the current location, one of the locations stored in the route-graph database. In the example in FIG. 4, the location allocated as the user's current location is assumed to be B. During allocation of the current location, when the user's current location does not match any of the locations stored in the route-graph database, the destination-candidate extracting unit 14 selects a nearest location from the locations indicated by the route graph and assumes the selected location as the current location. More specifically, the nearest location may be determined by executing processing for selecting, from the locations registered in the route-graph database, a location having the smallest distance to the coordinate points included in the current position information. Since this method can reduce the number of locations on the route graph which are to be registered in the route-graph database, it is possible to reduce the amount of information stored in the second storage unit 12.

In S103, the destination-candidate extracting unit 14 extracts, from the probability table stored in the second storage unit 12, primary destination candidates and the probability information for the current location determined in S102. The reason why the process in S103 is performed is to extract, from the probability table, only information for the current location determined in S102, since the information for multiple current locations is registered in the probability table. The probability table will be described below.

FIG. 6 illustrates an example of the probability table. As illustrated in FIG. 6, the probability table, which is stored in the second storage unit 12, is a table in which pieces of information about current locations, destinations, and probabilities with which travelers who are present at the current locations move to the corresponding destinations are associated with each other. It is preferable that all of the locations stored in the "location" fields in the route-graph database illustrated in FIG. 5 be registered in "current location" fields in the probability table. In FIG. 6, letters registered in the "current location" fields and "destination" fields correspond to the names of the locations (illustrated in FIG. 4) representing the destinations. Values registered in "probability" fields each indicate a probability with which a traveler who is present at the current location moves to the corresponding destination. This probability may be calculated using information illustrated in FIG. 7.

FIG. 7 illustrates an example of information of frequencies for respective past traveler movement routes. As illustrated in FIG. 7, the information of the frequencies for the respective past traveler movement routes is information in which current locations, destinations, and the numbers of travelers who moved from the current locations to the corresponding destinations (that is, frequencies) are associated with each other. Referring to FIG. 7, for example, the frequency at which travelers move from current location A to destination X is 40, and the frequency at which travelers move from current location A to destination Y is 10. In addition, there is no record indicating that a traveler has moved to a destination other than destinations X and Y. Hence, the probability with which a traveler moves from current location A to destination X is calculated as $\{40/(40+10)\} \times 100\% = 80\%$, and this calculation result is registered in the probability table illustrated in FIG. 6. Similarly, the probability with which a traveler moves from current location A to destination Y is calculated as $\{10/(40+10)\} \times 100\% = 20\%$, and this calculation result is registered in the probability table in FIG. 6. Performing the above-described processing for each combination of a current location and a destination makes it possible to create the probability table.

FIG. 8 illustrates a modification of the probability table. As illustrated in FIG. 8, this probability table is a table in which pieces of information about locations immediately preceding the current locations, the current locations, destinations, and probabilities with which travelers who are present at the current locations move to the corresponding destinations are associated with each other. This probability table is also stored in the second storage unit 12. For example, the probability table indicates that, when the location immediately preceding the current location is A and the current location is B, the traveler was present at A before current location B. Letters registered in "location immediately preceding current location" fields, "current location" fields, and "destination" fields correspond to the names of the locations (illustrated in FIG. 4 or 5) representing the destinations. Values registered in "probability" fields each indicate a probability with which a traveler who is present at the current location moves to the corresponding destination. The probability may be calculated based on information (illustrated in FIG. 9) of the past traveler movement routes.

FIG. 9 illustrates a modification of the information of the frequencies for the respective past traveler movement routes. As illustrated in FIG. 9, the information about the past traveler movement routes is information in which locations immediately preceding current locations, current locations, destinations, and the numbers of travelers who moved from the current locations to the corresponding destinations (that is, frequencies) are associated with each other. The information about the past traveler movement routes is stored in the second storage unit 12. Referring to FIG. 9, for example, the frequency at which travelers who have moved from location A to current location B move from current location B to destination X is 10. The frequency at which travelers who have moved from location A to current location B move from current location A to destination Y is 10. In addition, there is no record indicating that a traveler has moved to a destination other than destinations X and Y. Thus, the probability with which a traveler moves from current location A to destination X is calculated as $\{10/(10+10)\} \times 100\% = 50\%$, and this calculation result is registered in the probability table in FIG. 8. Similarly, the probability with which a traveler moves from current location A to destination Y is calculated as $\{10/(10+10)\} \times 100\% = 50\%$, and this calculation result is registered in the probability table in FIG. 8. Performing the above-described processing for each combination of a route up to a current location and a destination makes it possible to create the probability table.

Next, a specific example of processing according to the present embodiment will be described with reference to the probability table illustrated in FIG. 6. The description below will be given assuming that the current location of the terminal apparatus 30 is N.

Figure 10:
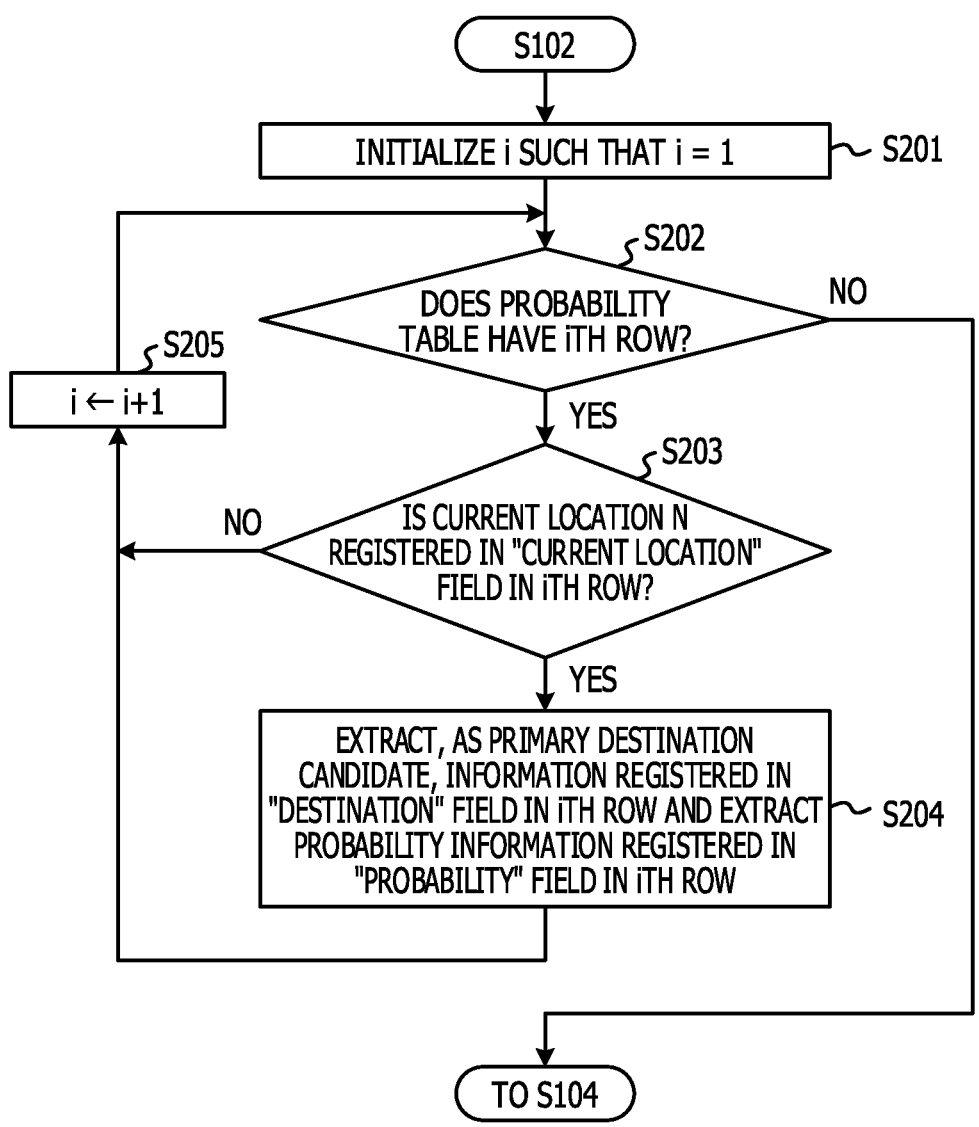
FIG. 10 is a flowchart illustrating an example of a process for extracting primary destination candidates and probability information in S103.

FIG. 10 is a flowchart illustrating an example of a process for extracting the primary destination candidates and the probability information in S103. The process in S103 is executed to sequentially search for, from a top row in the probability table, information for the current location determined in S102.

First, in S201, the destination-candidate extracting unit 14 initializes the value of i such that i=1, in order to perform searching starting at a first row in the probability table.

Subsequently, in S202, the destination-candidate extracting unit 14 searches the probability table to determine whether or not the probability table has the ith row. If the probability table has no ith row (negative in S202), it is determined that searching in all of the rows in the probability table is finished, and the process proceeds to S104 in FIG. 3. On the other hand, if the probability table has the ith row (affirmative in S202), the process proceeds to S203 in which a reference is made to the "current location" field in the ith row in the probability table to determine whether or not current location N is registered therein. If current location N is not registered in the "current location" field in the ith row (negative in S203), it is determined that information for the current location is not stored in the ith row in the probability table. Thus, in S205, the value of i is incremented and a value obtained by adding "1" to i is assumed to be a new value of i, in order to perform searching in a next row in the probability table. After the process in S205, the process returns to S202, and the process in S202 and the subsequent processes are executed again.

On the other hand, if current location N is registered in the "current location" field in the ith row in the probability table (affirmative in S203), the process proceeds to S204 in which the destination-candidate extracting unit 14 extracts, as a primary destination candidate, the information registered in the "destination" field in the ith row and also extracts the probability information registered in the "probability" field in the ith row. Thereafter, the process proceeds to S205 in which the value of i is incremented, and then returns to S202. The process in S202 and the subsequent processes are executed again in order to perform searching in the (i+1)th row or the subsequent row in the probability table.

Eventually, if searching in all of the rows in the probability table is finished, it is determined in S202 that the result in S202 is negative, and then the process proceeds to S104 in FIG. 3.

Information of all primary destination candidates and probabilities for the current location determined in S102 can be extracted from the probability table, in the manner described above.

Referring back to FIG. 3, after the process in S103, in S104, the destination determination unit 15 determines whether or not a next destination has been uniquely determined from among the primary destination candidates. Details of the process in S104 will be described below, assuming that a set of primary destination candidates is C1.

Figure 11:
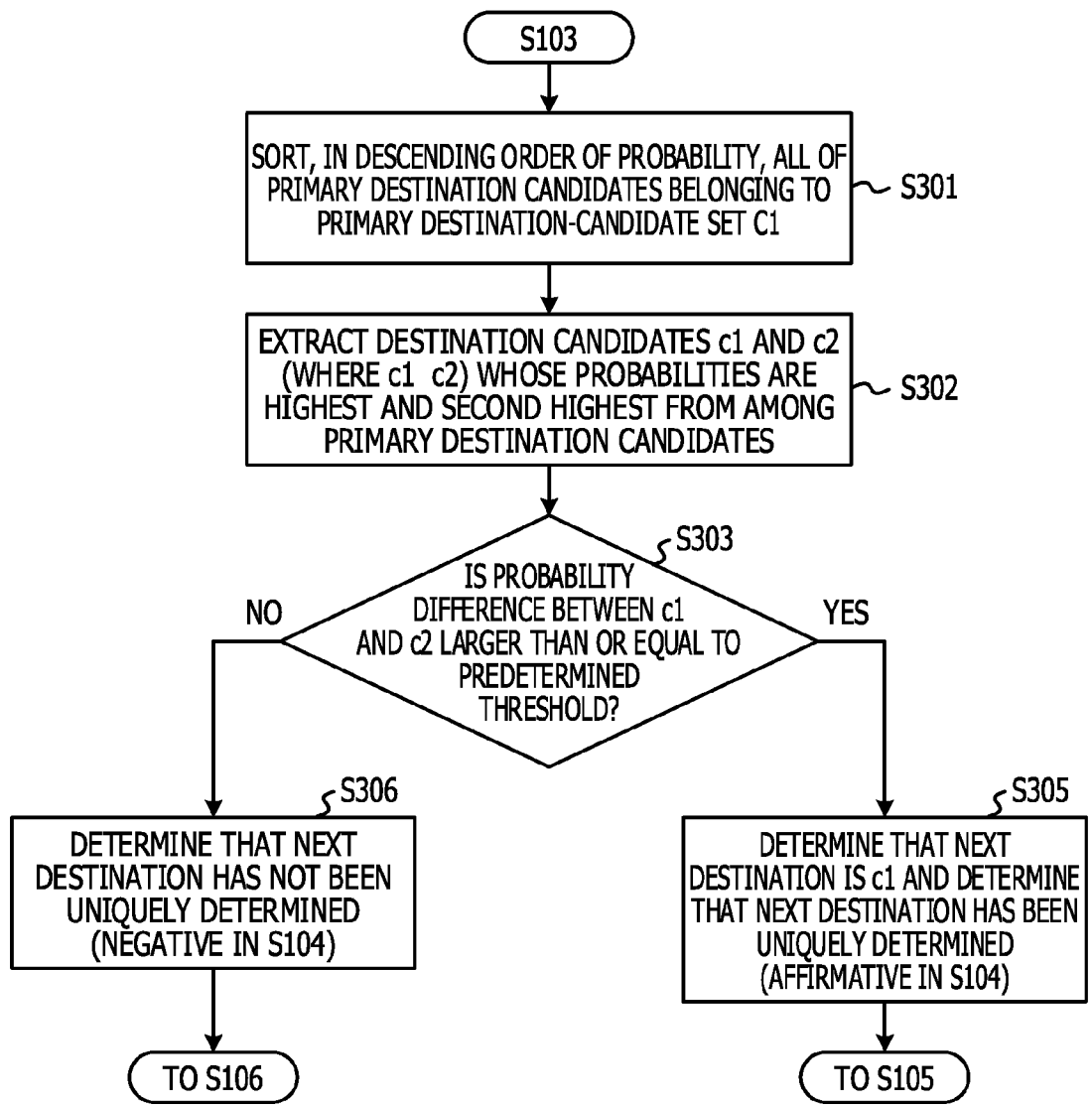
FIG. 11 is a flowchart illustrating an example of a process for determining a destination among the primary destination candidates in S104.

FIG. 11 is a flowchart illustrating an example of the process for determining the destination among the primary destination candidates in S104.

First, in S301, the destination determination unit 15 sorts, in descending order of probability, all of the primary destination candidates belonging to the primary destination-candidate set C1.

FIG. 12 illustrates an example of a result obtained by sorting, in descending order of probability, the primary destination candidates when the current location is A. It can be seen from FIG. 6 that the primary destination candidates are X and Y, the probability of moving from A to X is 80%, and the probability of moving from A to Y is 20%. Thus, when the primary destination candidates are sorted, they are arranged in the order X and Y.

In S302, the destination-candidate extracting unit 14 extracts destination candidates c1 and c2 (where c1≥c2) whose probabilities are the highest and the second highest from among the primary destination candidates. For instance, in the example in FIG. 12, the destination-candidate extracting unit 14 extracts X as the destination candidate c1 and extracts Y as the destination candidate c2.

Referring back to FIG. 11, in S303, the destination determination unit 15 determines whether or not a probability difference between c1 and c2 is larger than or equal to a predetermined threshold. For instance, in the example in FIG. 12, the probability difference between c1 and c2 is calculated as 80%−20%=60%. For example, when the threshold is set to 5%, 60%≥5% is obtained, and thus, in this case, the destination determination unit 15 determines that the probability difference between c1 and c2 is larger than or equal to the predetermined threshold (affirmative in S303).

If it is determined that the result in S303 is affirmative, the process proceeds to S305 in which the destination determination unit 15 determines that the next destination is c1. The destination determination unit 15 then determines that the next destination has been uniquely determined (affirmative in S104). Referring back to FIG. 3, in S105, the transmitting unit 16 transmits information about the determined next destination to the terminal apparatus 30 that issued the recommendation request. Thereafter, the series of processes executed by the destination-information providing apparatus 10 ends.

Referring back to FIG. 11, on the other hand, if the probability difference between c1 and c2 is smaller than the predetermined threshold (negative in S303), the process proceeds to S306 in which the destination determination unit 15 determines that the next destination has not been uniquely determined (negative in S104), since it is difficult to select one of c1 and c2. Subsequently, the process proceeds to S106 in FIG. 3.

For example, when the current location is B, X is extracted as c1, and Y is extracted as c2, the probability difference between c1 and c2 is calculated as 50%−50%=0%, based on the probability table illustrated in FIG. 6. If the threshold is set to 5%, 0%<5% is obtained, and thus, the destination determination unit 15 determines that the probability difference between c1 and c2 is smaller than the predetermined threshold (negative in S303). Subsequently, the process proceeds to S106.

In S106 in FIG. 3, in order to narrow down the primary destination candidates, the destination-candidate extracting unit 14 extracts secondary destination candidates from the primary destination candidates. The description below will be given of details of a method for extracting the secondary destination candidates.

Figure 13:
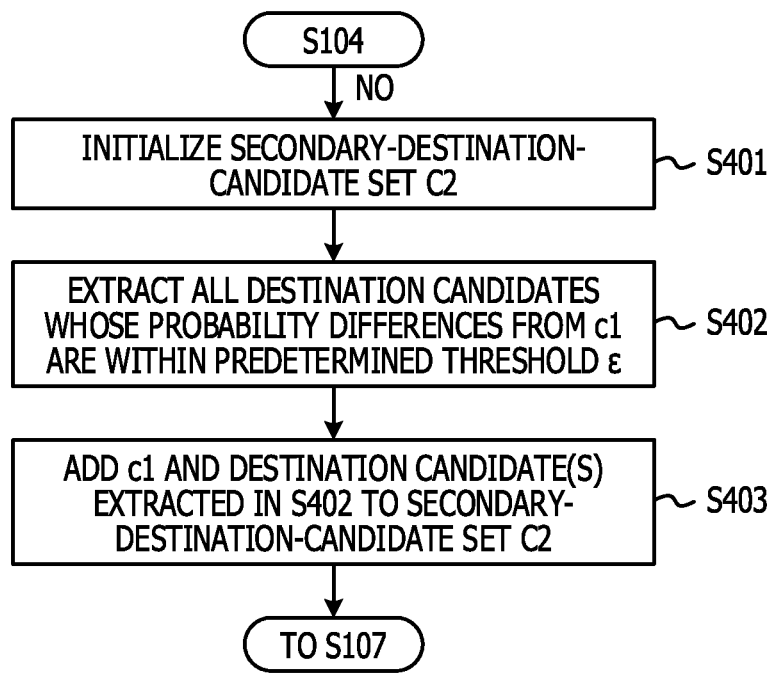
FIG. 13 is a flowchart illustrating an example of a method for extracting secondary destination candidates in S106.

FIG. 13 is a flowchart illustrating an example of a method for extracting the secondary destination candidates in S106.

First, in S401, the destination-candidate extracting unit 14 initializes a secondary-destination-candidate set C2 with an empty set.

Subsequently, in S402, the destination-candidate extracting unit 14 extracts all destination candidates whose probability differences from c1 are within a predetermined threshold E. In the example of the probability table illustrated in FIG. 6, only Y is the primary destination candidate whose probability difference from X is within the predetermined threshold ($\epsilon=5\%$). Thus, in S402, the destination-candidate extracting unit 14 extracts Y.

Subsequently, in S403, the destination-candidate extracting unit 14 adds c1 extracted in S302 in FIG. 11 and the destination candidate(s) extracted in S402 to the secondary-destination-candidate set C2. For example, when X is extracted as c1 in S302, the destination-candidate extracting unit 14 adds X and Y to the secondary-destination-candidate set C2 as secondary destination candidates. Thereafter, the process proceeds to S107 in FIG. 3. The destination-candidate extracting unit 14 may extract the secondary destination candidates, in the manner described above.

In S107 in FIG. 3, by using the information about the current location and the secondary destination candidates, the nearby-location extracting unit 17 extracts a nearby location adjacent to the current location. The term "nearby location" as used herein refers to a location that is estimated to indicate a movement tendency that is similar to that when a traveler departs from the current location, in view of the geography in the vicinity of the location where the traveler is present and a transportation network of roads, railroads, and so on. The reason why the nearby location is extracted is that the next destination can be estimated using the information corresponding to the nearby location when it is difficult to narrow down the next destination through use of the information corresponding to the current location, since a traveler who is present at the nearby location and a traveler who is present at the current location are presumed to have similar movement tendencies. If the nearby location is not used, data of all locations on the route graph are to be processed in order to estimate candidates of the next destination, which may lead to an increase in the processing time.

The description below will be given of a method for extracting a nearby location when a location adjacent to the current location on the route graph is assumed to be a nearby location as an example of the nearby location.

Figure 14:
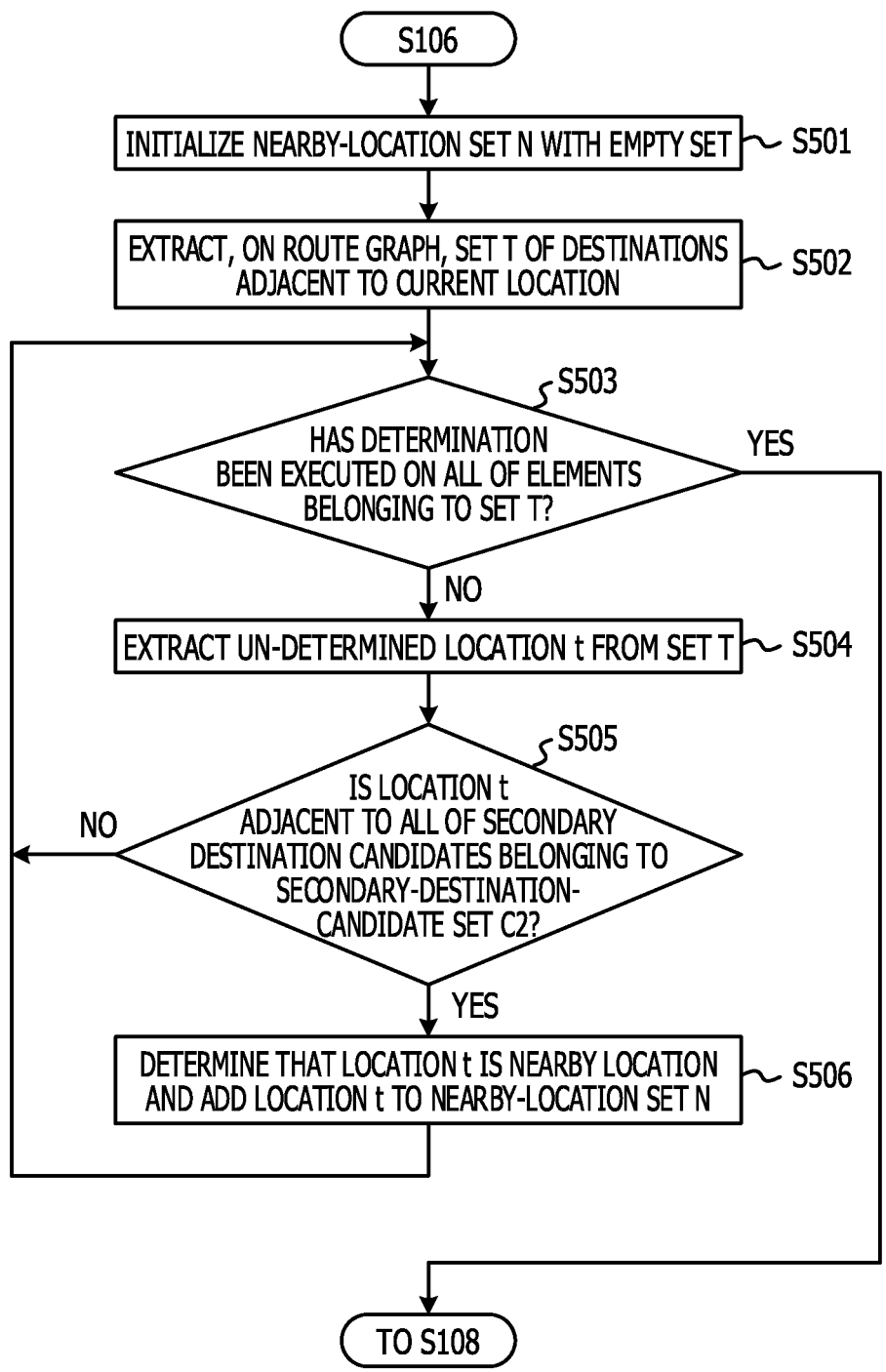
FIG. 14 is a flowchart illustrating an example of a method for extracting a nearby location in S107.

FIG. 14 is a flowchart illustrating an example of a method for extracting the nearby location in S107.

First, in S501, the nearby-location extracting unit 17 initializes a nearby-location set N with an empty set.

Subsequently, in S502, the nearby-location extracting unit 17 extracts, on the route graph, a set T of destinations adjacent to the current location. For example, when the current location is B, it can be seen from the route-graph database in FIG. 5 that the destinations adjacent to the current location B are the three locations A, X, and Y. Accordingly, the nearby-location extracting unit 17 extracts A, X, and Y as destinations belonging to the set T.

Subsequently, in S503, the nearby-location extracting unit 17 determines whether or not a determination in a process in S505, which is described below, has been executed on all of the destinations belonging to the set T. If it is determined that the determination has not been executed on all of the destinations (negative in S503), the process proceeds to S504 in which the nearby-location extracting unit 17 extracts an undetermined location t from the set T.

Subsequently, in S505, the nearby-location extracting unit 17 determines whether or not location t is adjacent to, on the route graph, all of the secondary destination candidates belonging to the secondary-destination-candidate set C2. If it is determined that location t is adjacent to, on the route graph, all of the secondary destination candidates belonging to the secondary-destination-candidate set C2 (affirmative in S505), the process proceeds to S506 in which location t is determined to be a nearby location and is added to the nearby-location set N. For example, when the secondary destination candidates are X and Y, and A is extracted as location t, A is adjacent to both of X and Y on the route graph, as indicated by the route-graph database in FIG. 5. Thus, the nearby-location extracting unit 17 determines that the result in S505 is affirmative, and adds A to the nearby-location set N.

On the other hand, if it is determined that location t is not adjacent to, on the route graph, all of the secondary destination candidates belonging to the secondary-destination-candidate set C2 (negative in S505), the process returns to S503, and the nearby-location extracting unit 17 executes the process in S503 and the subsequent processes again. For example, when the secondary destination candidates are X and Y, and X is extracted as location t, X is adjacent to neither X nor Y on the route graph, as indicated by the route-graph database in FIG. 5. Thus, the nearby-location extracting unit 17 determines that the result in S505 is negative. When the secondary destination candidates are X and Y, and Y is extracted as location t, Y is adjacent to neither X nor Y on the route graph, as indicated by the route-graph database in FIG. 5. Thus, in this case, the nearby-location extracting unit 17 also determines that the result in S505 is negative.

When the processes in S503 to S506 are repeated, the determination process on all of the locations belonging to the set T is eventually finished. If it is determined in S503 that the determination has been executed on all of the locations belonging to the set T (affirmative in S503), the nearby location belonging to the nearby-location set N is finalized, and the process proceeds to S108 in FIG. 3. Through the above-described processes, A is extracted as the nearby location.

Subsequently, in S108, the destination determination unit 15 obtains the probability information for the nearby location from the probability table, and determines a destination to be recommended, based on the probability information. In S108, the destination determination unit 15 determines the destination to be recommended, by searching for a destination having the highest probability among the destinations having starting points at the nearby location. For example, when the nearby location is A, the destinations that are selectable when current location A is assumed to be the starting point are the two locations X and Y, as indicated by the probability table in FIG. 6. In addition, the probability of moving from A to X is 80%, and the probability of moving from A to Y is 20%, as indicated by the "probability" fields in the probability table. That is, the probability of moving from A to X is higher than the probability of moving from A to Y. Thus, the destination determination unit 15 determines X as a destination to be recommended. When it is difficult to uniquely determine the destination to be recommended, for example, when the probability difference is within the predetermined threshold E, the destination determination unit 15 determines multiple destinations as destinations to be recommended.

After the process in S108, in S109, the transmitting unit 16 transmits the information about the determined destination(s) to the terminal apparatus 30 that issued the recommendation request.

FIG. 15 illustrates an example of the information about the destination to be recommended, the information being output to the user. As illustrated in FIG. 15, not only the destination to be recommended but also another candidate destination may be presented to the user in conjunction with the corresponding probability information. In such a case, the number of options for the user increases, thus making it possible to improve the convenience.

Figure 16:
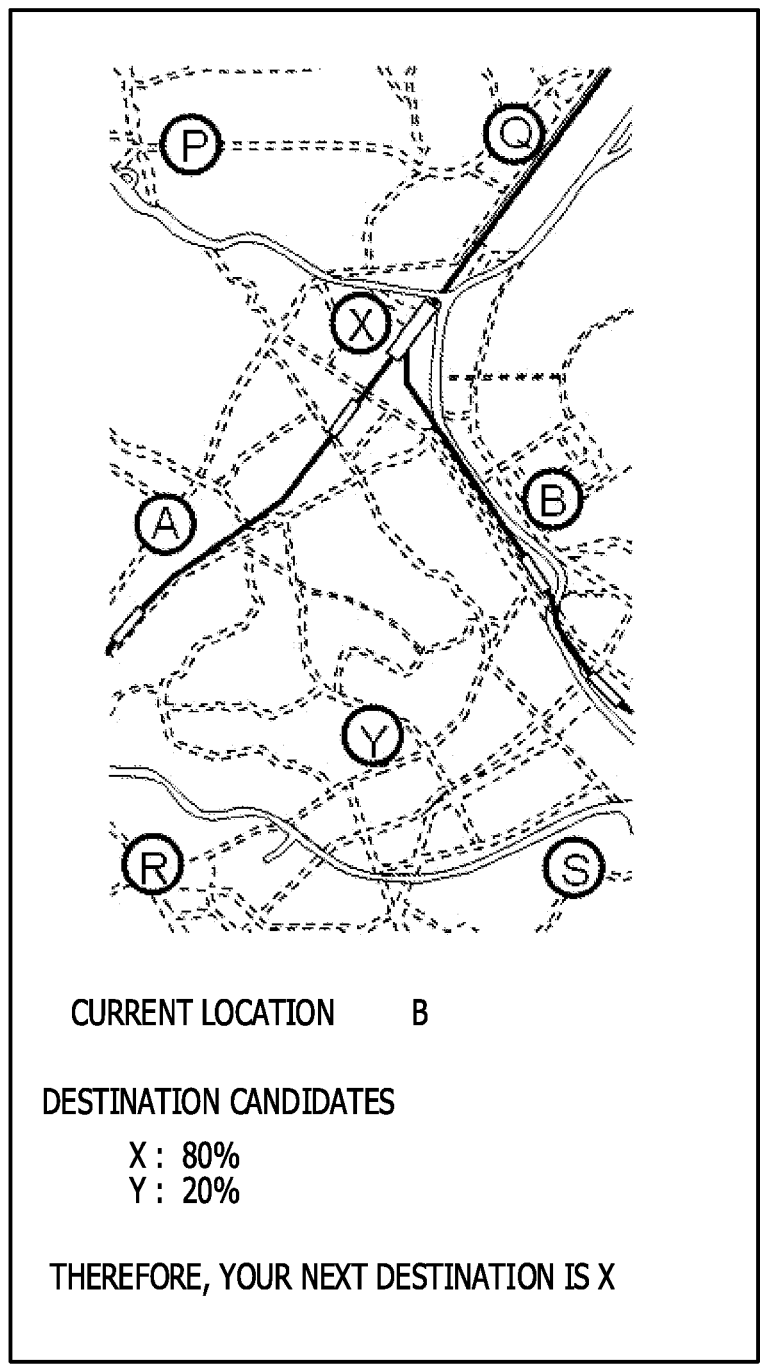
FIG. 16 illustrates another example of the information about the destination to be recommended, the information being output to the user.

FIG. 16 illustrates another example of the information about the destination to be recommended, the information being output to the user. As illustrated in FIG. 16, the route graph superimposed on a map, together with the information illustrated in FIG. 15, may also be presented to the user as the information about the destination to be recommended. More specifically, first, map information, together with the route graph, is pre-stored in the second storage unit 12. The transmitting unit 16 then reads, from the second storage unit 12, the map information corresponding to an area in a predetermined range centered on the current location and included in the route graph stored in the second storage unit 12. Thereafter, the transmitting unit 16 superimposes the route graph on the map and transmits information resulting from the superimposition to the corresponding terminal apparatus 30. The destination-information providing apparatus 10 may provide the user with the information illustrated in FIG. 16, in the manner described above.

According to the method described above, it is possible to two-dimensionally recognize the destination by referring to the map, thus making it possible to improve the user convenience. After the process in S109, the series of processes executed by the destination-information providing apparatus 10 ends.

The destination-information providing apparatus 10 can provide the user of the destination-information providing service with information about a destination to be recommended, in the manner described above.

The destination-information providing apparatus 10 may employ a method for determining, as a candidate of the next destination, a destination having the highest probability, based on probabilities with which travelers move from the current location to destinations. With this method, however, when multiple destinations have approximately the same probabilities, it is difficult to determine one of the destinations.

According to the present embodiment, the information about the current location is received, a nearby location that is a location near the current location is extracted, and the probabilities of moving from the nearby location to destination candidates are compared with each other to thereby determine a destination among the destination candidates. According to this method, the destination-information providing apparatus 10 can narrow down the destination candidates by determining the next destination through use of the probability information for the nearby location, even if it is difficult to determine the next destination based on the probability information for the current location. Accordingly, it is possible to improve the accuracy of determining candidates of a next destination by using the simple method.

(Modification)

Next, a description will be given of a modification of the destination-information providing method. Since an information processing system that realizes this modification may employ the configuration of the destination-information providing system illustrated in FIG. 1, a description thereof is not given hereinafter.

In the embodiment described above, if the next destination has not been uniquely identified from among the primary destination candidates, then the secondary destination candidates are extracted from the primary destination candidates, and a location that is adjacent to both the current location and the secondary destination candidates is extracted as a nearby location. As opposed to the embodiment described above, this modification has a feature in that, if the next destination has not been uniquely identified from among the primary destination candidates, then a location having a transportation network common to that of the current location is selected as a nearby location from locations adjacent to the current location on the route graph.

Figure 17:
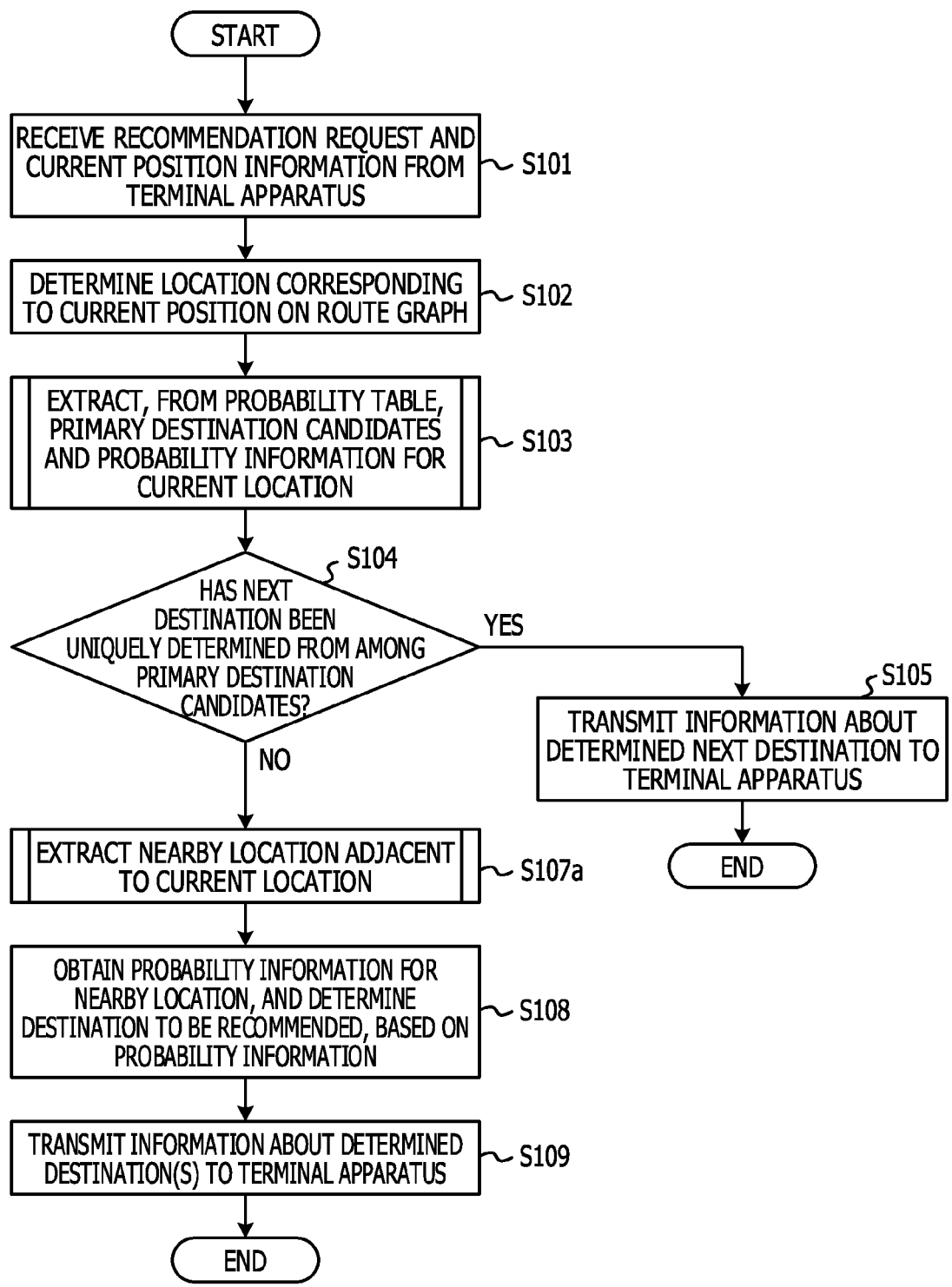
FIG. 17 is a flowchart illustrating a modification of the destination-information providing method.

FIG. 17 is a flowchart illustrating the modification of the destination-information providing method. Processes up to S104 and a process in S105, which is executed if it is determined that the result in S104 is affirmative, are substantially the same as those in FIG. 3.

If it is determined in S104 in FIG. 17 that the next destination has not been uniquely determined from among the primary destination candidates (negative in S104), the process proceeds to S107*a* in which the nearby-location extracting unit 17 extracts a nearby location adjacent to the current location.

Figure 18:
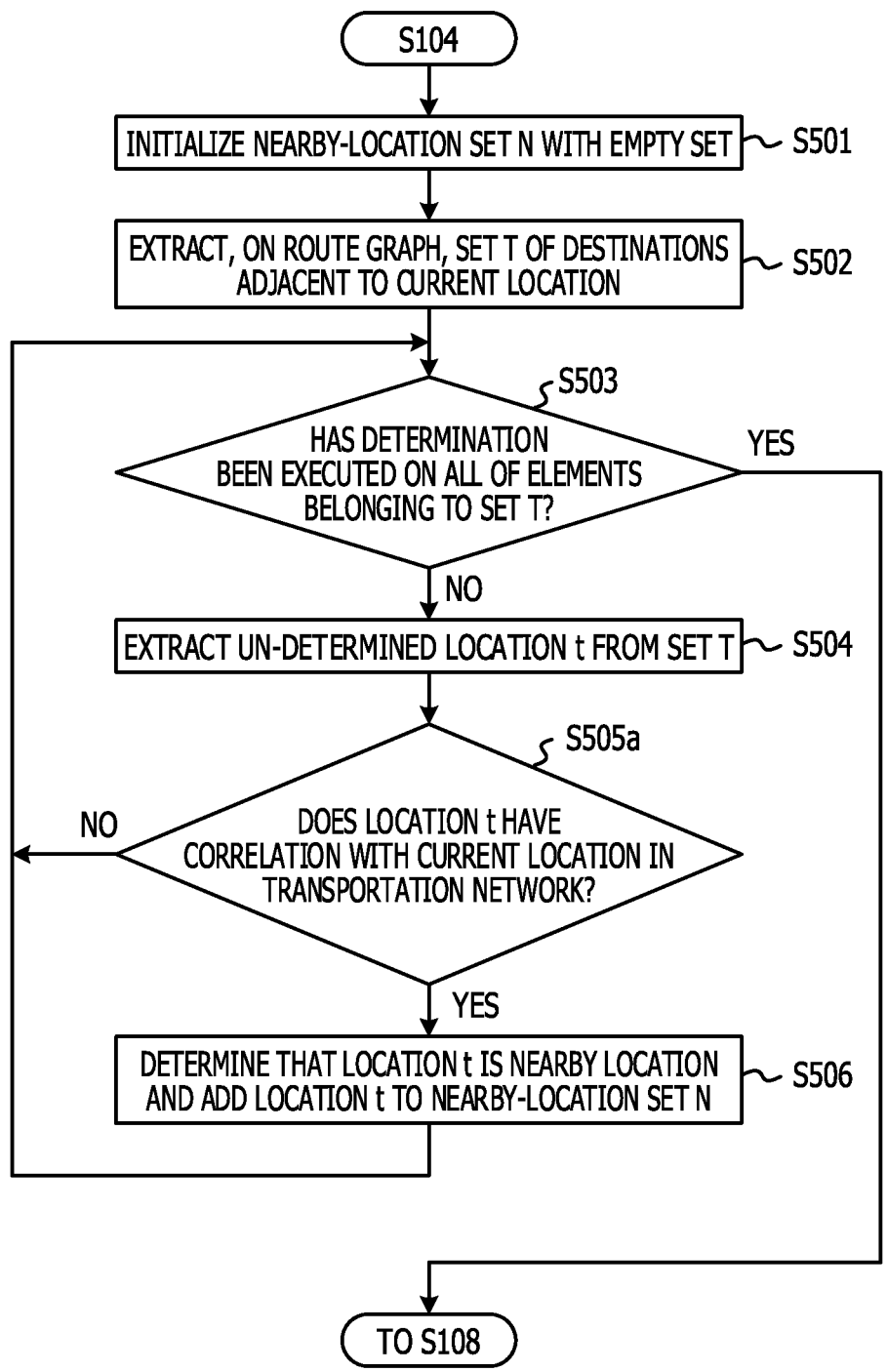
FIG. 18 is a flowchart illustrating an example of a method for extracting a nearby location in S107*a*.

FIG. 18 is a flowchart illustrating an example of a method for extracting the nearby location in S107*a*. Processes in S501 to S504 in FIG. 18 are substantially the same as those in FIG. 14. If an un-determined location t is extracted from the set T in S504, the process proceeds to S505*a* in which the nearby-location extracting unit 17 determines whether or not location t has a correlation with the current location in a transportation network. More specifically, a database in which information about a transportation network for each location is stored is pre-stored in the second storage unit 12.

Figure 19:
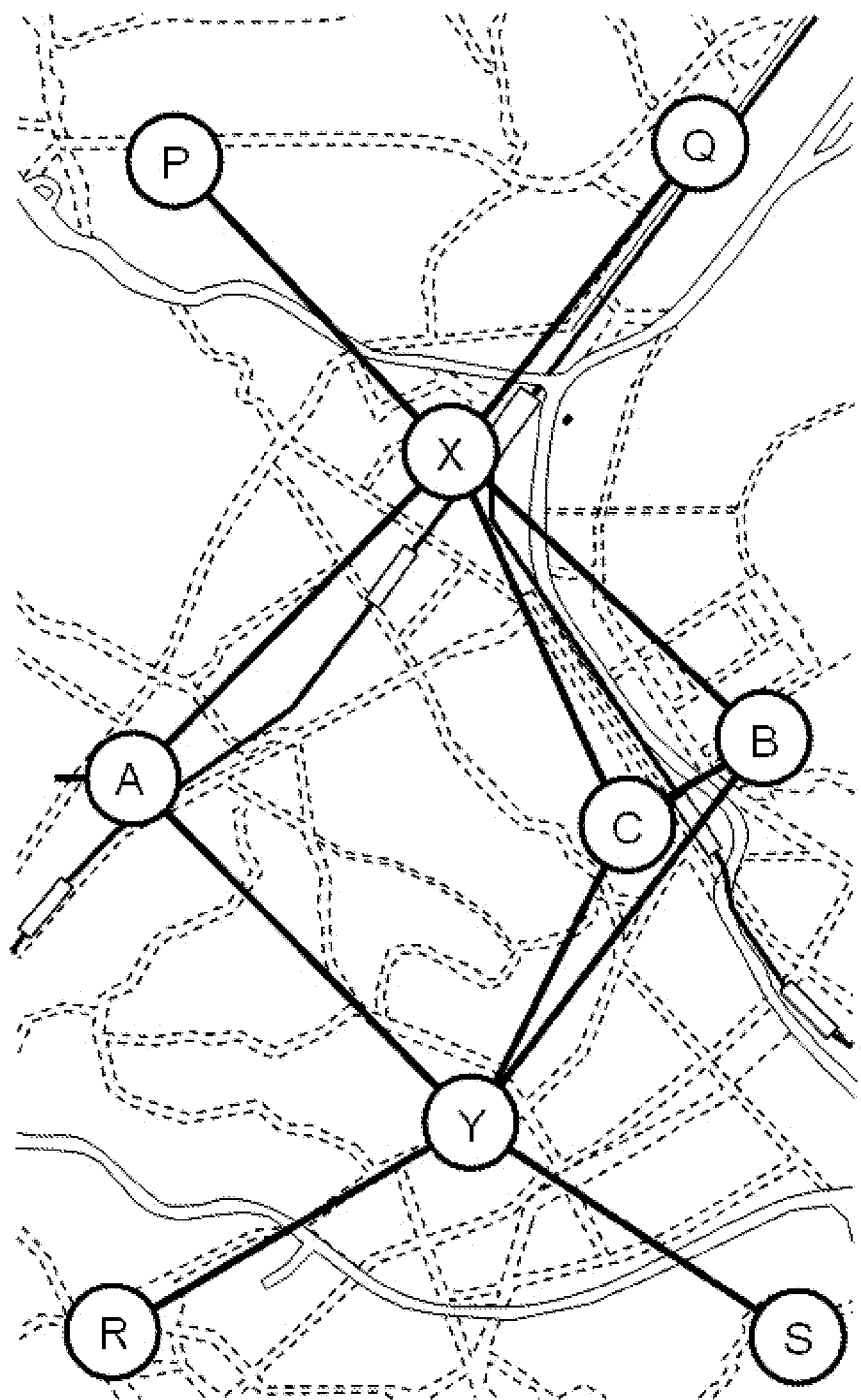
FIG. 19 illustrates an example of the route graph.

FIG. 19 illustrates an example of the route graph. In FIG. 19, location C is newly added to the route graph illustrated in FIG. 4. FIG. 20 is a table illustrating an example of a transportation network database. In the transportation network database illustrated in FIG. 20, the locations included in the route graph in FIG. 19 are registered in association with the names of nearest railroad lines and the names of nearest arterial roads. The arterial roads are, for example, national roads or highways. Symbol "-" in FIG. 20 indicates that corresponding information does not exist and is not registered.

For example, when the current location is B in S505*a* and C is extracted as location t, B and C are common to each other in that the nearest railroad lines are line a and line b, as indicated by the transportation network database illustrated in FIG. 20. B and C are also common to each other in that the nearest arterial roads include national road 16. Hence, in this case, the nearby-location extracting unit 17 determines that location t (t=C) has a correlation with the current location in the transportation network (affirmative in S505*a*). In S506, the nearby-location extracting unit 17 determines location t as a nearby location and adds location t to the nearby-location set N. Thereafter, the process returns to S503.

On the other hand, in S505*a*, for example, when the current location is B, and A is extracted as location t, the nearest railroad line to A is line c, and the nearest railroad lines to B are line a and line b, as indicated by the transportation network database illustrated in FIG. 20. Thus, it can be understood that A and B have no common point in the railroad lines. The nearest arterial road to A is national road 1, and the nearest arterial roads to B are national road 16 and national road 133. Thus, it can be understood that A and B also have no common point in the arterial roads. Accordingly, the nearby-location extracting unit 17 determines that location t (t=A) has no correlation with the current location in the transportation network (negative in S505*a*), and the process returns to S503.

If it is determined in S503 that the determination has been executed on all of the elements belonging to the set T (affirmative in S503), the process proceeds to S108 in FIG. 17. A process in S108 and the subsequent process are substantially the same as those illustrated in FIG. 3. When multiple locations are extracted as nearby locations as a result of the process in S505a, the distances between the current location and the extracted locations may be measured using the coordinate points information, and the location having the smallest distance may be selected as a nearby location.

When travelers move beyond waking distance, they are generally highly likely to use a transportation network. As in this modification, based on the information about transportation networks for respective locations, a location having a correlation with the current location in the transportation network may be determined to be a nearby location. This makes it possible to extract a nearby location that is geographically similar to the current location. Thus, it is possible to improve the accuracy of selecting a destination to be recommended.

While the preferred embodiment of the present disclosure has been described above in detail, the present disclosure is not limited to the particular embodiment, and various changes and modifications are possible thereto. For example, the present disclosure may be applied to not only applications for determining destinations of people but also applications for determining destinations of vehicles or luggage. The present disclosure may also be applied to not only travel guide services but also, for example, services for recommending movement routes that are not congested and services for providing forecasts of congestion and traffic jams.

The destination-information providing apparatus 10 may also use a display device, incorporated thereinto, to display the information about a destination to be recommended. This configuration allows a provider of the destination-information providing service to recognize the usage status of the destination-information providing service and the adequateness of processing results, while referring to the display screen of the display device. The display device is implemented by, for example, a liquid-crystal display, a plasma display, and an organic electroluminescent (EL) display.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of providing destination information executed by a processor included in a destination-information providing apparatus, the method comprising:
   receiving information of a current position of a terminal apparatus;
   extracting a current location corresponding to the current position from route information including a plurality of entries respectively having a combination of a location, coordinate points of the location, and one or more adjacent locations adjacent to the location;
   determining one or more first destination candidates respectively indicating a candidate of a next destination for the current location, based on probability information including a plurality of entries respectively having a combination of a current location, a destination, and a probability with which a plurality of travelers who are at the current location move to the destination;
   determining one or more second destination candidates among the one or more first destination candidates based on the probability information, when the next destination is not uniquely identifiable from among the one or more first destination candidates;
   extracting a nearby location adjacent to each of the one or more second destination candidates and the current location from among one or more adjacent locations corresponding to the current location included in the route information; and
   determining the next destination among the one or more second destination candidates, by assuming the nearby location as the current location of the terminal apparatus and based on probabilities with which a plurality of travelers who are at the nearby location move to the one or more second destination candidates included in the probability information.

2. The destination-information providing method according to claim 1,
   wherein the determining of the one or more first destination candidates includes determining a destination for the current location as the first destination candidate, when the current location corresponding to the determined current location is included in the probability information.

3. The destination-information providing method according to claim 1,
   wherein the determining of the one or more second destination candidates includes:
   sorting the first destination candidates in descending order of the probabilities; and
   determining that the next destination is not uniquely identifiable from among the first destination candidates, when the probabilities for two or more of the sorted first destination candidates are highest.

4. The destination-information providing method according to claim 1,
   wherein the determining of the one or more second destination candidates includes:
   sorting the first destination candidates in descending order of the probabilities; and
   determining that the next destination is not uniquely identifiable from among the first destination candidates, when a difference between the probability for the first destination candidate whose probability is highest among the sorted first destination candidates and the probability for the first destination candidate whose probability is second highest is smaller than a predetermined threshold.

5. The destination-information providing method according to claim 1,
   wherein the determining of the one or more second destination candidates includes:
   determining, as the second destination candidates, the first destination candidate whose probability is highest among the first destination candidates sorted in descending order of the probabilities and the first destination candidate corresponding to the probability whose difference from the probability for the first destination candidate whose probability is the highest is within a predetermined threshold.

6. The destination-information providing method according to claim 1,
   wherein the extracting of the nearby location includes selecting a location that is included in locations adjacent to the current location and that has a transportation network common to the current location.

7. The destination-information providing method according to claim 1,
wherein the determining of the next destination includes:
sorting the second destination candidates in descending order of the probabilities; and
determining, when a difference between the probability for the first destination candidate whose probability is highest among the sorted first destination candidates and the probability for the first destination candidate whose probability is second highest is larger than or equal to a predetermined threshold, the first destination candidate whose probability is the highest as the next destination.

8. The destination-information providing method according to claim 1,
wherein the determining of the next destination includes determining, when a difference between the probability for the first destination candidate whose probability is highest among the first destination candidates that are sorted and the probability for the first destination candidate whose probability is second highest is smaller than a predetermined threshold, the first destination candidate whose probability is the highest and the first destination candidate whose probability is the second highest as next destinations for the current location.

9. The destination-information providing method according to claim 1, further comprising:
obtaining information of a map including the current location;
generating output information by superimposing the route information on the map; and
transmitting the output information and information about the next destination to the terminal apparatus.

10. The destination-information providing method according to claim 1,
wherein the probability stored in the probability information is calculated using past travelers information in which at least current locations, destinations, and numbers of past travelers respectively moved from a current location that is one of the current locations to a destination that is one of the destinations are associated with each other.

11. The destination-information providing method according to claim 10,
wherein the past travelers information is information in which locations immediately preceding the current locations, the locations, the destinations, and the numbers of past travelers are associated with each other.

12. A destination-information providing apparatus, comprising:
a memory; and
a processor coupled to the memory and configured to:
receive information of a current position of a terminal apparatus;
extract a current location corresponding to the current position from route information including a plurality of entries respectively having a combination of a location, coordinate points of the location, and one or more adjacent locations adjacent to the location;
determine one or more first destination candidates respectively indicating a candidate of a next destination for the current location based on probability information including a plurality of entries respectively having a combination of a current location, a destination, and a probability with which a plurality of travelers who are at the current location move to the destination;
determine one or more second destination candidates among the one or more first destination candidates based on the probability information, when the next destination is not uniquely identifiable from among the one or more first destination candidates;
extract a nearby location adjacent to each of the one or more second destination candidates and the current location from among one or more adjacent locations corresponding to the current location included in the route information; and
determine the next destination among the one or more second destination candidates, by assuming the nearby location as the current location of the terminal apparatus and based on probabilities with which a plurality of travelers who are at the nearby location move to the one or more second destination candidates included in the probability information.

13. A non-transitory computer-readable storage medium storing a program causing a computer to execute a process, the process comprising:
receiving information of a current position of a terminal apparatus;
extracting a current location corresponding to the current position from route information including a plurality of entries respectively having a combination of a location, coordinate points of the location, and one or more adjacent locations adjacent to the location;
determining one or more first destination candidates respectively indicating a candidate of a next destination for the current location, based on probability information including a plurality of entries respectively having a combination of a current location, a destination, and a probability with which a plurality of travelers who are at the current location move to the destination;
determining one or more second destination candidates among the one or more first destination candidates based on the probability information, when the next destination is not uniquely identifiable from among the one or more first destination candidates;
extracting a nearby location adjacent to each of the one or more second destination candidates and the current location from among one or more adjacent locations corresponding to the current location included in the route information; and
determining the next destination among the one or more second destination candidates, by assuming the nearby location as the current location of the terminal apparatus and based on probabilities with which a plurality of travelers who are at the nearby location move to the one or more second destination candidates included in the probability information.

* * * * *